(12) United States Patent
Ahad

(10) Patent No.: US 7,182,402 B1
(45) Date of Patent: Feb. 27, 2007

(54) SEAT RECLINE CONTROL OVERRIDE

(75) Inventor: Sam J. Ahad, Newhall, CA (US)

(73) Assignee: Timco Aviation Services, Inc., Greensboro, NC (US)

( * ) Notice: Subject to any disclaimer, the term of this patent is extended or adjusted under 35 U.S.C. 154(b) by 0 days.

(21) Appl. No.: 10/873,939

(22) Filed: Jun. 22, 2004

(51) Int. Cl.
B60N 2/02 (2006.01)
F16C 1/10 (2006.01)
F16C 1/22 (2006.01)
F16C 1/12 (2006.01)

(52) U.S. Cl. .......................... 297/362.13; 297/354.12; 297/362.12; 74/502.4; 74/502.6; 74/501.6

(58) Field of Classification Search .......... 297/362.12, 297/362.13, 362.14, 354.12; 74/502.4, 502.6, 74/501.5 R, 500.5, 501.6, 110
See application file for complete search history.

(56) References Cited

U.S. PATENT DOCUMENTS

| | | | |
|---|---|---|---|
| 3,102,754 A | 9/1963 | Junkunc | 297/162 |
| 3,145,052 A * | 8/1964 | Morgan | 297/354.1 |
| 3,392,954 A | 7/1968 | Malitte | 248/429 |
| 3,730,019 A * | 5/1973 | Ballard | 74/502 |
| 4,354,398 A * | 10/1982 | Porter | 74/501.6 |
| 4,634,182 A | 1/1987 | Tanaka | 297/379 |
| 4,662,676 A | 5/1987 | Havelock | 297/194 |
| 4,787,576 A * | 11/1988 | McGrady et al. | 244/122 R |
| 4,887,864 A * | 12/1989 | Ashton | 297/375 |
| 4,944,552 A | 7/1990 | Harris | 297/145 |
| 5,029,822 A * | 7/1991 | Selzer | 267/64.12 |
| 5,058,829 A | 10/1991 | Bentley | 244/122 |
| D333,420 S | 2/1993 | Bales et al. | D8/349 |
| 5,419,616 A * | 5/1995 | Paetzold | 297/378.12 |
| 5,449,132 A | 9/1995 | Gilbert | 244/122 |
| 5,451,092 A | 9/1995 | Gray | 297/122 |
| 5,553,923 A | 9/1996 | Bilezikjian | 297/452.2 |
| 5,558,391 A | 9/1996 | Chavous | 297/153 |
| 5,651,587 A | 7/1997 | Kodaverdian | 297/423.36 |
| 5,722,722 A | 3/1998 | Massara | 297/216.13 |
| 5,758,544 A * | 6/1998 | Lee | 74/483 R |
| 5,762,296 A | 6/1998 | Gilbert | 244/118.1 |
| 5,765,911 A | 6/1998 | Sorenson | 297/173 |
| 5,794,470 A | 8/1998 | Stringer | 70/261 |
| 5,871,259 A * | 2/1999 | Gehart | 297/362.12 |
| 5,871,318 A | 2/1999 | Dixon et al. | 410/105 |
| 5,887,949 A | 3/1999 | Kodaverdian | 297/423.36 |
| 5,890,765 A | 4/1999 | LaPointe et al. | 297/354.13 |
| 6,003,394 A | 12/1999 | Heckel, Jr. | 74/89.15 |
| 6,019,429 A * | 2/2000 | Tedesco | 297/328 |
| 6,086,155 A | 7/2000 | Stiffler | 297/362 |
| 6,106,067 A | 8/2000 | Zhuang et al. | 297/361.1 |
| 6,279,416 B1 * | 8/2001 | Bucholtz et al. | 74/501.5 H |
| 6,669,295 B2 * | 12/2003 | Williamson | 297/362.13 |

(Continued)

Primary Examiner—Peter M. Cuomo
Assistant Examiner—Sarah B. McPartlin
(74) Attorney, Agent, or Firm—MacCord Mason PLLC

(57) ABSTRACT

A seating apparatus for an aircraft comprising: a passenger seat having a seat frame and a seat back; a recline control device for selectively reclining the seat back; and a seat recline control override for disabling the recline control device. In the preferred embodiment, the passenger seat includes a seat leg supporting the seat. Also in the preferred embodiment, the seat recline control override comprises: an override lever for overriding the recline control; an actuator for remotely moving the override lever; and a linkage connecting the override lever to the actuator.

30 Claims, 4 Drawing Sheets

U.S. PATENT DOCUMENTS

| | | | |
|---|---|---|---|
| 6,793,282 B2 | 9/2004 | Plant et al. | 297/248 |
| 6,802,568 B1 | 10/2004 | Johnson | 297/452.2 |
| 2003/0111888 A1* | 6/2003 | Brennan | 297/316 |
| 2004/0145225 A1* | 7/2004 | Alter | 297/367 |

* cited by examiner

SEAT RECLINE CONTROL OVERRIDE

BACKGROUND OF THE INVENTION (1) Field of the Invention

The present invention relates generally to aircraft seating and, more particularly, to a seat recline control override apparatus for an aircraft seating assembly.

(2) Description of the Prior Art

Most commercial aircraft passenger seats are designed to recline several inches from the full upright position for passenger comfort. Traditionally, seat back recline is accomplished by a spring-loaded hydraulic device known as a "recline lock". The recline lock is controlled by a shielded control cable connected to a mechanical push button, which is usually mounted on a seat armrest. To recline the seat, the passenger pushes the button and leans back on the seat. The button pulls the cable, which actuates a lever at the other end that opens the hydraulic valve in the recline lock, allowing it to compress and thus allow the seat to recline. If the passenger wants to return the seatback to the upright position, he or she again pushes the button and leans forward. The valve on the recline lock will again be opened, allowing the internal spring to expand the recline lock and move the seatback forward.

For safety reasons, the FAA Federal Aviation Administration requires that the recline function of center seats at emergency exit locations be disabled during taxi, takeoff and landing. During flight, the recline function can be enabled. This must be done by flight crew personnel without the use of tools or mechanical expertise. Thus, there is a need for a recline control override device for overriding a traditional seat recline lock that can be conveniently operated by a member of an aircraft flight crew.

SUMMARY OF THE INVENTION

The present invention is directed to a seating apparatus for an aircraft comprising: a passenger seat having a seat frame and a seat back; a recline control device for selectively reclining the seat back; and a seat recline control override for disabling the recline control device. In the preferred embodiment, the passenger seat includes a seat leg supporting the seat. Also in the preferred embodiment, the seat recline control override comprises: an override lever for overriding the recline control; an actuator for remotely moving the override lever; and a linkage connecting the override lever to the actuator.

In the preferred embodiment, the apparatus may further include a base to which the override lever is pivotably connected. The apparatus may further include a spring biasing an end of the override lever away from the base. An end of the override lever may be selectively movable between at least two positions. One of the positions may be a lock position. One of the positions may be an unlock position. The actuator may include a handle. The handle may be selectively movable between at least two positions. One of the positions may be a lock position. One of the positions may be an unlock position. The actuator may further include a shaft connected to the handle. The shaft may include a circumscribing edge at least partially defining a recess for retaining the shaft in a position. The actuator may further include a protrusion about which the recess is selectively positionable. The protrusion may be adjustable. The linkage may include a cable. The apparatus may further include an additional override lever for overriding an additional recline control. The apparatus may further include an additional linkage connecting the additional override lever to the actuator. The actuator may remotely move the additional override lever.

In the preferred embodiment, the apparatus may further include a baggage bar for retaining baggage below the seat. The apparatus may further include an armrest attached to the seat frame. The apparatus may further include a headrest attached to the seat back. The apparatus may further include a serving tray attached to the seat back. The seat recline control device may include a recline lock. The seat recline control device may include a control button.

Accordingly, one aspect of the present invention is to provide a seating apparatus for an aircraft comprising: a passenger seat having a seat frame and a seat back; a recline control device for selectively reclining the seat back; and a seat recline control override for disabling the recline control device.

Another aspect of the present invention is to provide a seat recline control override apparatus for an aircraft seating assembly having a recline control, the seat recline control override apparatus comprising: an override lever for overriding the recline control; an actuator for remotely moving the override lever; and a linkage connecting the override lever to the actuator.

Still another aspect of the present invention is to provide a seating apparatus for an aircraft comprising: a passenger seat having a seat frame, a seat back and a seat leg supporting the seat; a recline control device for selectively reclining the seat back; and a seat recline control override for disabling the recline control device comprising: an override lever for overriding the recline control; an actuator for remotely moving the override lever; and a linkage connecting the override lever to the actuator.

These and other aspects of the present invention will become apparent to those skilled in the art after a reading of the following description of the preferred embodiment when considered with the drawings.

DESCRIPTION OF THE PREFERRED EMBODIMENTS

Figure 1:
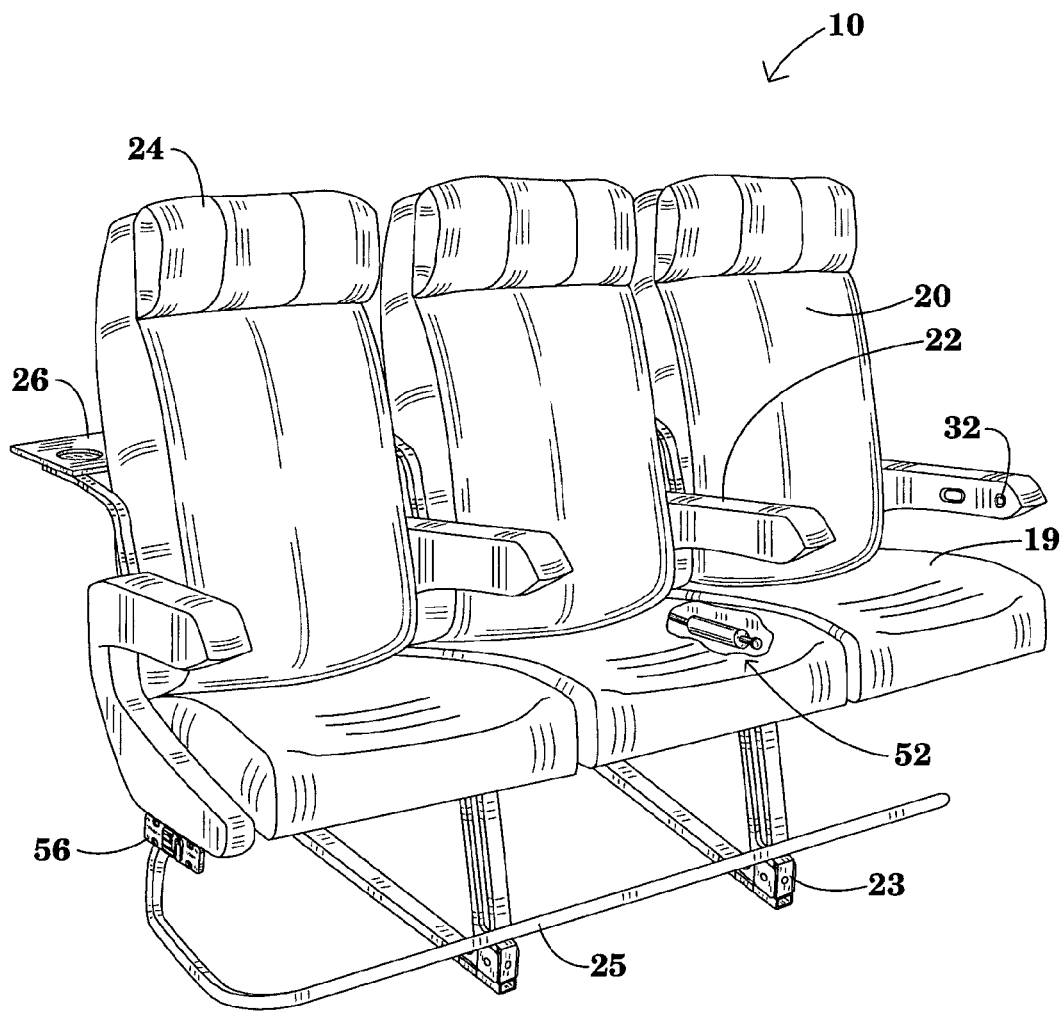
FIG. 1 is a perspective view of a seating apparatus for an aircraft.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, the illustrations are for the purpose of describing a preferred embodiment of the invention and are not intended to limit the invention thereto. As best seen in FIG. 1, a seating apparatus for an aircraft, generally designated 10, is shown constructed according to the present invention. The seating apparatus 10 includes a passenger seat having a seat back 20, a recline control device 52 for selectively reclining the seat back, and a seat recline control override 56 for disabling the recline control device 52.

The seating apparatus 10 includes a seat leg 23 supporting the seat frame 19, a baggage bar 25 for retaining baggage below the seat frame 19, and an armrest 22 attached to the seat frame 19. The seating apparatus 10 further includes a headrest 24 and serving tray 26 attached to the seat frame 19. FIG. 1 also shows a control button 32 for controlling the seat recline control device.

Figure 2:
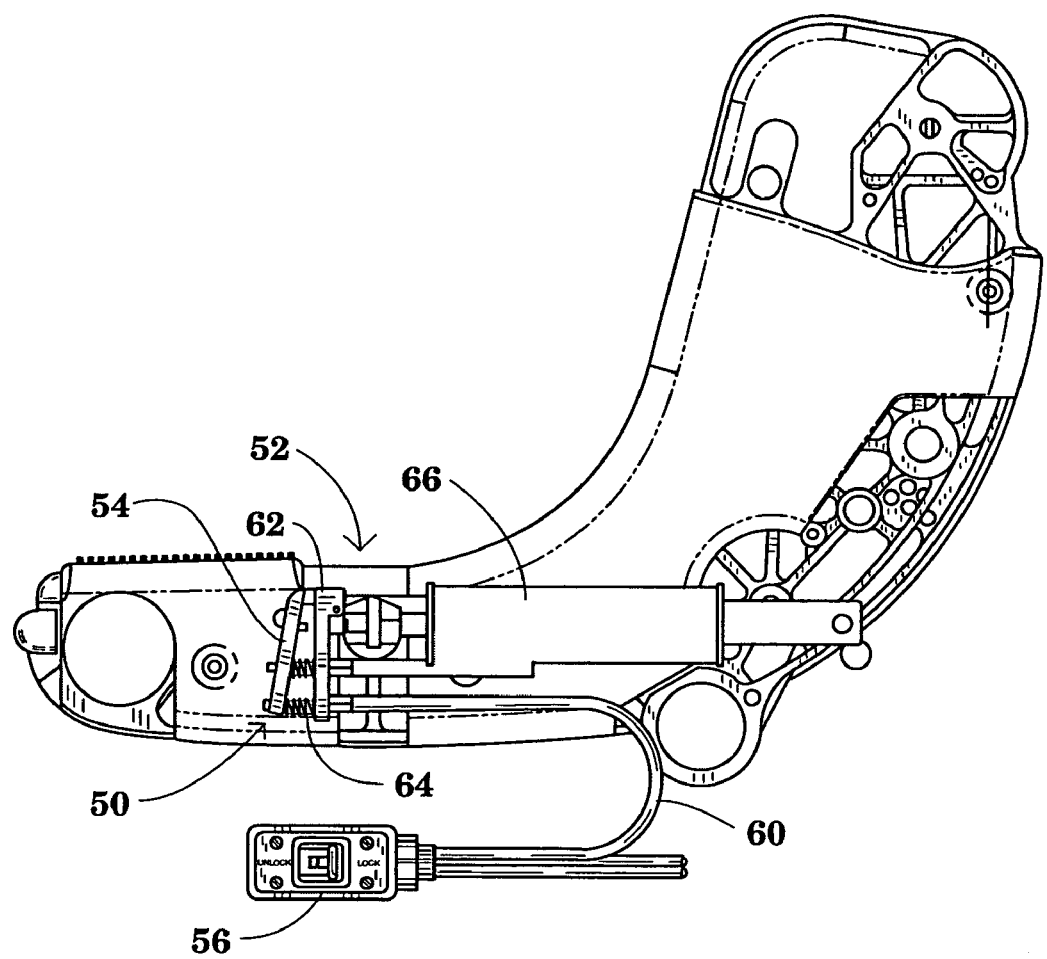
FIG. 2 is a side view of a seat recline control override apparatus.

FIG. 2 shows a seat recline control override apparatus 50 for an aircraft seating assembly having a recline control 52, the seat recline control override apparatus 50 comprises an override lever 54 for overriding the recline control, an actuator 56 for remotely moving the override lever 54, and a linkage 60 connecting the override lever 54 and the actuator 56.

The seat recline control override apparatus 50 further includes a base 62 to which the override lever 54 is pivotably connected, and a spring 64 biasing an end of the override lever 54 away from the base 62. The override lever 54 is selectively movable between at least a two positions. One of the positions locks the override, preventing the operation of the recline control, and one of the positions unlocks the override, allowing the recline control to operate. A linkage 60 including a cable connects the override lever 54 to the actuator 56. FIG. 2 also shows a recline lock 66 for a seat recline control device.

Figure 3:
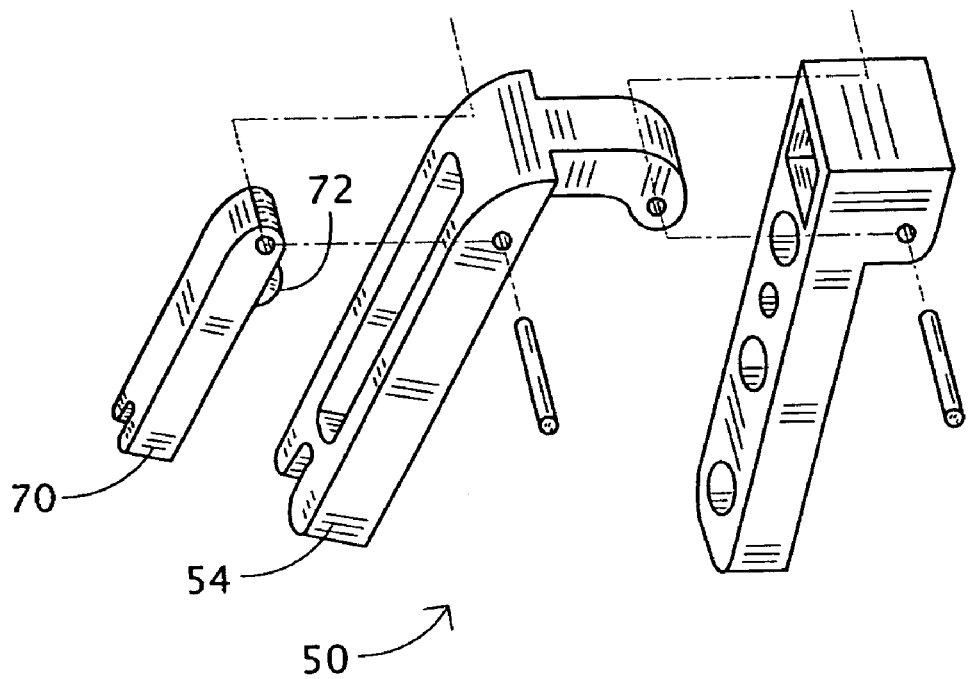
FIG. 3 is a side perspective view of a base, override lever, and standard recline lever for a seat recline control override apparatus.

FIG. 3 is a perspective view of a base for seat recline control override apparatus 50, a seat recline control override lever 54, and a standard lever 70 for a seat recline control. The standard lever 70 includes a tab 72 for releasing a valve in the recline lock. The tab is aligned such that when the standard lever pivots toward the base, the tab depresses a valve in the recline lock. The valve opens the recline lock, allowing the recline lock to compress when the button is depressed for reclining the seat. When the button is depressed again for returning the seat to its upright position, the tab on the standard lever again opens the valve, and a spring within the recline lock returns the seat to its upright position.

The recline control override lever is pivotably attached to the base and the standard recline control lever is pivotably attached, and nests within, the override lever, although the standard lever can be pivotably attached aside the override lever. When the lower end of the override lever 54 is moved toward the base into a lock position, the pivot point of the standard recline lever 70 changes. This change in the pivot point of the standard lever 70 terminates the alignment between the tab on the standard lever and valve in the recline lock. With the alignment offset as such, the recline lock button can be depressed, but the valve in the recline lock does not open, and the seat will not recline. Thus, the seat recline is overridden by the seat recline control override apparatus 50.

Figure 4:
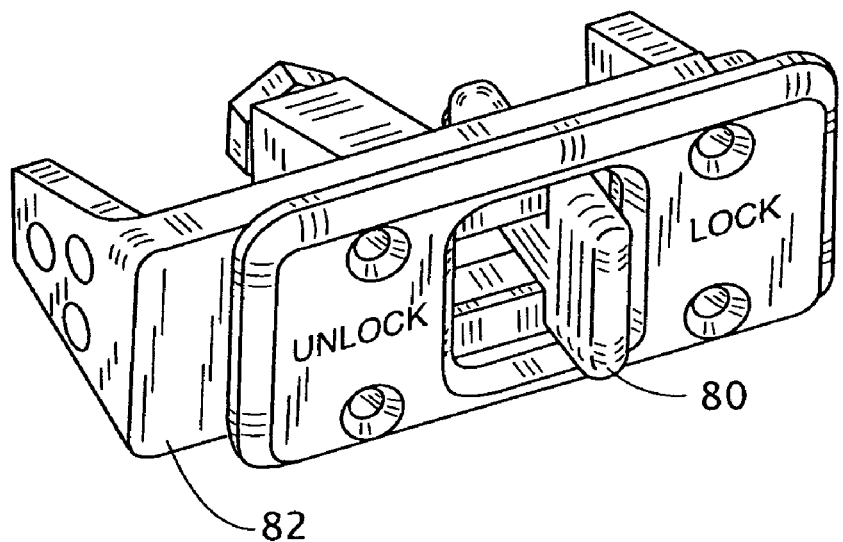
FIG. 4 is a perspective view of a handle and appurtenant housing for a seat recline control override apparatus.

FIG. 4 is a perspective view of a handle 80 and appurtenant housing 82 for the actuator 56 for remotely moving the override lever. The handle is selectively movable between at least two positions. One of the positions locks the override, preventing the operation of the recline control, and one of the positions unlocks the override, allowing the recline control to operate.

Figure 5:
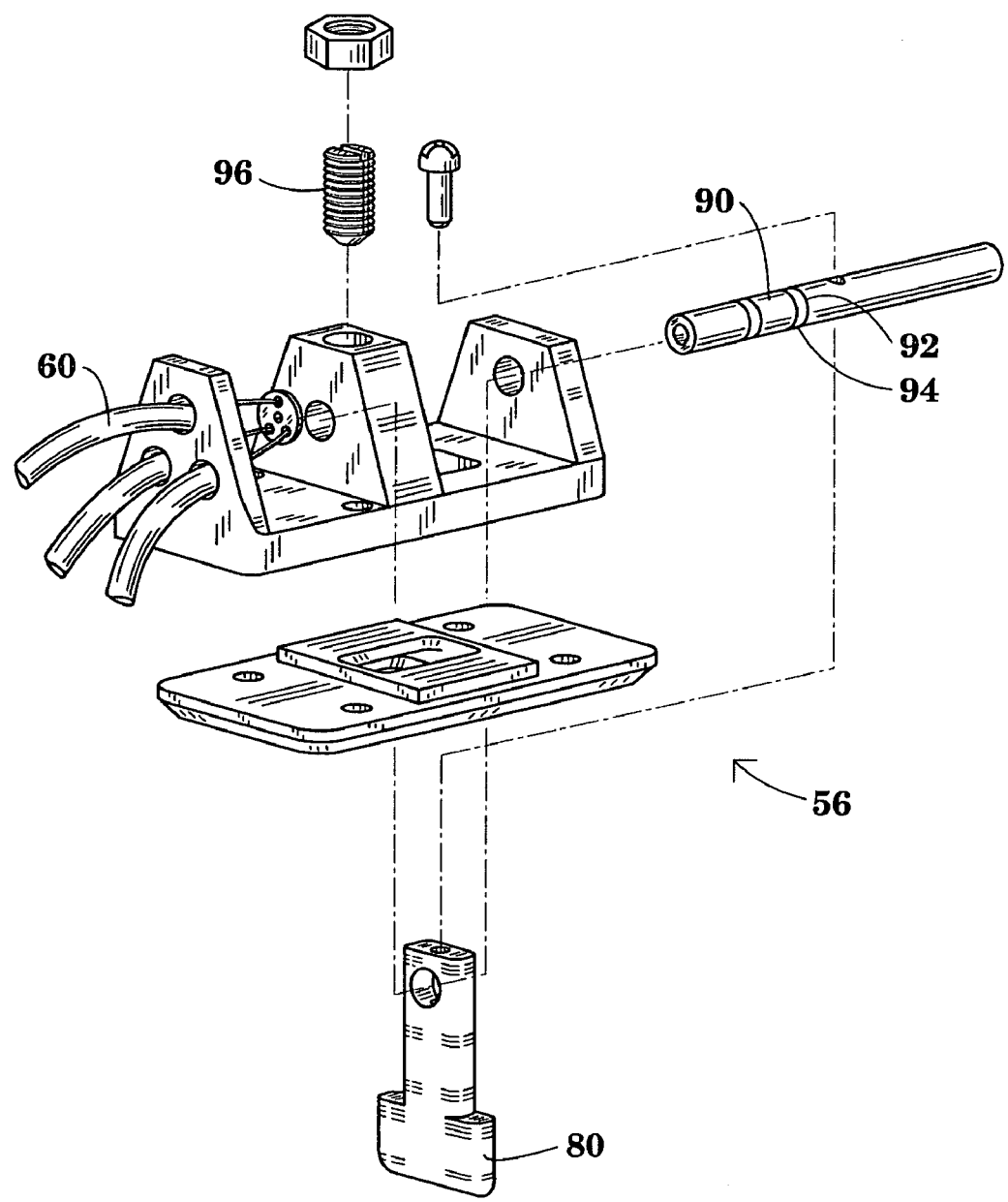
FIG. 5 is a perspective view of components of the seat recline control override apparatus including the handle and appurtenant housing, and a shaft.

FIG. 5 is an additional perspective top view of the actuator for remotely moving the override lever. The actuator 56 includes a shaft 90 connected to the handle 80. The shaft 90 includes a circumscribing edge 92 at least partially defining a recess 94 for retaining the shaft 90 in a position. The actuator further includes a protrusion 96 about which the recess 94 is selectively positionable. The size of the protrusion 96 is adjustable. The actuator 56 remotely moves multiple override levers, as is needed where an aircraft aisle divides the seating in an aircraft such that multiple seats exits on a side of the aisle. Additional override levers are operably connected to the actuator through an additional linkage 60 to the override lever.

Certain modifications and improvements will occur to those skilled in the art upon a reading of the foregoing description. By way of example, the actuator 56 can incorporate a pivoting linkage in lieu of a sliding one. The actuator 56 can be a rotary type with an over-center cam. Also, the override lever 54 can be of a sliding type in lieu of a pivoting one. All such modifications and improvements have been deleted herein for the sake of conciseness and readability but are properly within the scope of the following claims.

We claim:

1. A seating apparatus for an aircraft comprising:
   (a) a passenger seat having a seat frame and a seat back;
   (b) a recline control device including a lever connected to an actuator for selectively reclining the seat back; and
   (c) a seat recline control override for retaining the seat in an upright position comprising:
      (i) an override lever for overriding the recline control device having the control device lever nested therein;
      (ii) an override actuator for remotely moving the override lever and the recline control device lever; and
      (iii) a linkage connecting the override lever to the override actuator.

2. The apparatus according to claim 1, further including a baggage bar for retaining baggage below the seat.

3. The apparatus according to claim 1, further including an armrest attached to the seat frame.

4. The apparatus according to claim 1, further including a headrest attached to the seat back.

5. The apparatus according to claim 1, further including a serving tray attached to the seat back.

6. The apparatus according to claim 1, wherein the seat recline control device includes a control button.

7. The apparatus according to claim 1 further including a base to which the override lever is pivotably connected.

8. The apparatus according to claim 1 further including a spring biasing an end of the override lever away from the base.

9. The apparatus according to claim 1 wherein an end of the override lever is selectively movable between at least two positions.

10. The apparatus according to claim 9 wherein one of the positions is a lock position.

11. The apparatus according to claim 9 wherein one of the positions is an unlock position.

12. The apparatus according to claim 1 wherein the override actuator includes a handle selectively movable between at least two positions.

13. The apparatus according to claim 12 wherein one of the positions is a lock position.

14. The apparatus according to claim 12 wherein one of the positions is an unlock position.

15. The apparatus according to claim 1 wherein the override actuator further includes a shaft connected to a handle.

16. The apparatus according to claim 15 wherein the shaft includes a circumscribing edge at least partially defining a recess for retaining the shaft in a position.

17. The apparatus according to claim 16 wherein the override actuator further includes a protrusion about which the recess is selectively positionable.

18. The apparatus according to claim 17 wherein the protrusion is adjustable.

19. The apparatus according to claim 1 wherein the linkage includes a cable.

20. The apparatus according to claim 1 further including an additional override lever for overriding an additional recline control.

21. The apparatus according to claim 20 further including an additional linkage connecting the additional override lever to the actuator.

22. The apparatus according to claim 21 wherein the actuator remotely moves the additional override lever.

23. A seating apparatus for an aircraft comprising:
(a) a passenger seat having a seat back and a recline lock for retaining the seat back in a position with respect to the seat;
(b) a pair of levers pivotal about disparate fulcrums such that pivoting a first of the pair displaces the fulcrum of a second of the pair to prevent the second from releasing the recline lock; and
(c) an actuator for pivoting only the second of the pair of levers and an actuator for pivoting the first of the pair of levers to displace the fulcrum of the second of the pair of levers and prevent release of the recline lock.

24. The apparatus according to claim 23, further including a headrest attached to the seat back.

25. The apparatus according to claim 23, wherein the actuator for pivoting only the second of the pair of levers includes a control button.

26. The apparatus according to claim 23 further including a base to which the first of the pair of levers is pivotably connected.

27. The apparatus according to claim 26 further including a spring biasing an end of the first of the pair of levers away from the base.

28. The apparatus according to claim 23 wherein the actuator for pivoting the second of the pair of levers includes a handle movable between at least two positions.

29. The apparatus according to claim 28 further including a linkage between the handle and the second of the pair of levers.

30. The apparatus according to claim 29 wherein the linkage includes a cable.

* * * * *

UNITED STATES PATENT AND TRADEMARK OFFICE
CERTIFICATE OF CORRECTION

PATENT NO. : 7,182,402 B1
APPLICATION NO. : 10/873939
DATED : February 27, 2007
INVENTOR(S) : Sm J. Ahad It is certified that error appears in the above-identified patent and that said Letters Patent is hereby corrected as shown below:

In Column 1, Line 27, "center" should read --certain--

Signed and Sealed this

Twenty-fourth Day of April, 2007

JON W. DUDAS
*Director of the United States Patent and Trademark Office*